Dec. 7, 1937. K. T. WILLIAMSON 2,101,207
BATTERY CHARGING APPARATUS
Filed May 11, 1935
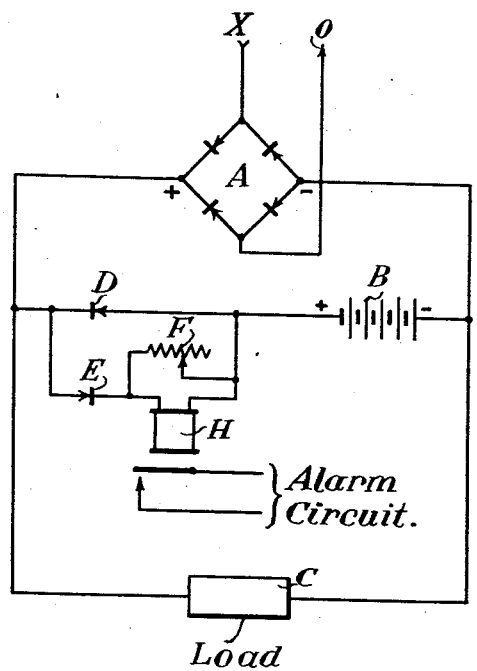
INVENTOR
Kenneth T. Williamson.
BY
HIS ATTORNEY Patented Dec. 7, 1937

2,101,207

UNITED STATES PATENT OFFICE 2,101,207

BATTERY CHARGING APPARATUS

Kenneth T. Williamson, Pittsburgh, Pa., assignor to The Union Switch & Signal Company, Swissvale, Pa., a corporation of Pennsylvania Application May 11, 1935, Serial No. 21,046

2 Claims. (Cl. 177—311)

My invention relates to battery charging apparatus. More specifically, my invention relates to battery charging apparatus which provides current for a load as well as for charging a standby battery, and wherein provision is made for indicating, by a suitable alarm, when the battery is being discharged in excess of a predetermined rate.

I will describe one form of apparatus embodying my invention, and will then point out the novel features thereof in claims.

The accompanying drawing is a diagrammatic view illustrating one form of apparatus embodying my invention.

Referring now to the drawing, the reference character A designates a source of rectified direct current which is here shown as a rectifier of the full-wave type, the input terminals of which are connected to terminals X and O of a suitable source of alternating current. The output terminals of the rectifier A are connected to a load C. The load C, for example, may be railway signaling apparatus.

Connected across the output terminals of, and charged by, the rectifier A, is a storage battery designated by the reference character B. The battery B is provided for the purpose of furnishing a portion or all of the current for the load C, when, for any reason, the rectifier A fails to furnish such current.

Interposed between the positive terminal of the battery B and the positive terminal of the rectifier A is a half-wave rectifier designated by the reference character D, and so connected as to permit the passage of only such current as may flow out of the battery.

Connected in series, and in a shunt path around rectifier D, are a relay designated by the reference character H and another half-wave rectifier designated by the reference character E. Rectifier E is so connected as to permit the passage, through the circuit branch in which it is included, of only such current as may flow into the battery.

Connected across the operating winding of relay H, for the purpose of regulating the amount of current which may flow through the relay, is an adjustable resistor designated by the reference character F.

The contacts of the relay H may be employed for controlling a suitable alarm, either visible or audible, or both, so that an alarm may be given when relay H releases. Since the particular form of alarm forms no part of my present invention, I have omitted such alarm from the drawing.

It is apparent from the foregoing description that the back contact of relay H will become opened, thereby disconnecting the alarm, when the relay H is receiving current of sufficient magnitude to pick it up, and that the back contact will become closed to operate the alarm when the current flowing in relay H is reduced to a value below the release value of relay H. The points at which relay H will pick up and release may, of course, be regulated by varying the value of the adjustable resistor F, or by properly choosing the resistance of relay H or by both.

It will be noted that the resistor F, and the rectifiers D and E in series, each form a closed circuit on the operating winding of relay H so that relay H will have a slow release characteristic.

It is apparent that when the battery is being charged, at least a portion of the charging current flows through relay H so that the relay may become energized. It is also apparent that when the rectifier is inoperative and the battery B is steadily discharging, no current may flow through the relay H, and, therefore, the relay will become released. I have discovered, however, that when the rectifier A is operating the relay H may be energized even if the battery B is furnishing a portion of the current for the load C. The explanation for this lies in the fact that when the rectifier A is operating the battery B is receiving a cyclic charge and discharge. That is, the current produced by the rectifier A is not a steady continuous current but consists of a series of pulsations. When the voltage of a pulsation is greater than the voltage of the battery, current flows through rectifier E and relay H into the battery, but between pulsations, or when the voltage of the battery is greater than the voltage of the pulsation, current will flow out of the battery through rectifier D. During the part of the cycle when the battery is being charged, the winding of the relay H will be energized, and during the part of the cycle when the battery is being discharged, the current will flow through the rectifier D so that the energization built up in the winding of relay H is not destroyed during the discharge cycle. The slow release characteristic of the relay H aids in maintaining the energization of the relay during the part of the cycle when the current is flowing through rectifier D. If the current produced by the rectifier A is increased or the current required by the load C is decreased, the cyclic charge current of the battery B will be increased, whereas if the current produced by the rectifier A is decreased or the current required by the load C is increased, the cyclic charge current will be decreased. I have found that the cyclic charge current may be of sufficient magnitude to hold the relay H in its energized position even if the battery is discharging current to the load C substantially equal to the current furnished by the rectifier A.

The current from the rectifier A usually will be so regulated as to be sufficient to carry the load C and to provide at least enough current to overcome the internal losses of the battery B. Under these conditions the current flowing into battery B will be sufficient to pick up the relay H and thereby open the alarm circuit. Whenever the current required by the load C increases or the output of the rectifier A decreases so that battery B is called upon to assume all or a portion of the load, the battery will discharge current through rectifier D. The relay H will usually be so adjusted as to release whenever the discharge current from the battery B exceeds a predetermined value.

Due to the slow release characteristic of the relay H, intermittent increases of short duration in the current required by the load C, even if greater than the predetermined value, will not cause the relay H to become released.

If the load C should become increased, or the output of the rectifier decreased sufficiently to cause the alarm to operate, the attendant will immediately take steps to increase the output current of the rectifier A, or to otherwise insure that the battery will not be discharged to a point of exhaustion.

The relay H will, of course, become energized, when the output of the rectifier A is increased, and will remain energized as long as the battery is not discharging current in excess of the predetermined value.

If, as suggested above, the load C is railway signaling apparatus, and if the battery B were permitted to discharge a relatively heavy current indefinitely, serious interruptions to the movement of traffic might occur in the event of a failure of the signaling apparatus due to exhaustion of the battery when, for example, the battery is called upon to furnish the entire current for a period of several hours. It is very important, therefore, that the maintenance forces of such a signaling system have definite and positive knowledge when the battery is in danger of being discharged to a point of exhaustion. My invention provides a simple and reliable means for indicating such occurrences so that the maintenance forces may take proper steps to provide a suitable remedy.

While I have described my invention as being particularly adapted for operating an alarm when the discharge current of the battery B exceeds a predetermined value, the alarm may be caused to operate under a wide range of charge and discharge conditions with respect to the battery. For example, the relay H may be so chosen and adjusted as to release even if the battery B is being charged. That is, if desired, the release value of relay H may be so regulated as to cause the operation of the alarm if the battery is not being charged at a predetermined rate.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination with a source of direct current, a load and a battery both connected in multiple with said source, a relay interposed in series with said battery, an indicating circuit controlled by said relay, a rectifier connected in series with said relay and poled to permit current flowing into the battery from the source to energize the relay, and a shunt path around the relay and the first rectifier including a second rectifier poled to permit the flow of current from said battery to said load through such shunt.

2. In combination, a storage battery, a source of unidirectional current having a maximum voltage value higher than the voltage of said battery as well as having a minimum voltage value lower than the voltage of said battery, a load, a pair of conductors for connecting said load to said source, means including a first asymmetric unit poled to permit current to flow from said battery for connecting said battery across said conductors, means including a second asymmetric unit poled in the opposite direction connected around said first asymmetric unit to permit current to flow into said battery, whereby said battery is subjected to a cyclic charge and discharge, a circuit, and means for controlling said circuit in accordance with the magnitude of the current of said cyclic charge.

KENNETH T. WILLIAMSON.